United States Patent [19]

Beale, Jr.

[11] Patent Number: 4,569,765
[45] Date of Patent: Feb. 11, 1986

[54] CHROMIUM OXIDE IN ION EXCHANGE RESIN

[75] Inventor: Alvin F. Beale, Jr., Lake Jackson, Tex.

[73] Assignee: The Dow Chemical Company, Midland, Mich.

[21] Appl. No.: 576,092

[22] Filed: Feb. 1, 1984

Related U.S. Application Data

[62] Division of Ser. No. 403,887, Jul. 30, 1982, Pat. No. 4,446,252, which is a division of Ser. No. 248,656, Mar. 27, 1981, Pat. No. 4,366,261.

[51] Int. Cl.$^4$ .............................................. B01D 15/04
[52] U.S. Cl. .................... 210/673; 210/681; 210/687; 210/688
[58] Field of Search .............. 210/673, 679, 681, 682, 210/687, 688; 423/265, 659

[56] References Cited

U.S. PATENT DOCUMENTS

| | | | |
|---|---|---|---|
| 3,723,310 | 3/1973 | Lang et al. | 210/727 |
| 4,039,442 | 8/1977 | Kadlec et al. | 210/673 |
| 4,246,355 | 1/1981 | Balto et al. | 210/679 |

Primary Examiner—Ivars Cintins
Attorney, Agent, or Firm—W. J. Lee

[57] ABSTRACT

Novel anion exchange resin composites having hydrous chromium III oxide ($Cr_2O_3 \cdot nH_2O$) incorporated therein are useful in removing a wide array of polyvalent metal cations from aqueous solution.

6 Claims, No Drawings

CHROMIUM OXIDE IN ION EXCHANGE RESIN

This is a divisional of application Ser. No. 403,887, filed July 30, 1982, now U.S. Pat. No. 4,446,252, which is a divisional of application Ser. No. 248,656, filed Mar. 27, 1981, now U.S. Pat. No. 4,366,261.

BACKGROUND OF THE INVENTION

The present invention relates, generally, to the art of incorporating hydrated metal oxide compounds into ion exchange resins to provide composites which remove various metal cations from aqueous brine solutions.

For instance, U.S. Pat. No. 4,116,856, U.S. Pat. No. 4,116,858, and U.S. Pat. No. 4,159,311 disclose preferential removal of Li+ values from brine solutions containing other metal ions, by using an anion exchange resin containing crystalline $LiOH.2Al(OH)_3$, also known as hydrous lithium aluminate. U.S. Pat. No. 4,116,857, U.S. Pat. No. 4,183,900, and U.S. Pat. No. 4,243,555 disclose preferential removal of Mg++ values from brine by using an anion exchange resin containing crystalline $MgCl_2.2Al(OH)_3$.

U.S. Pat. No. 4,048,283 teaches removal of heavy metals, such as Pb, from aqueous solutions by treatment with chromate or dichromate ions under certain conditions of pH and temperature which precipitate heavy metal chromates. The chromium treating agents are in solution and are not supported on a resin.

SUMMARY OF THE INVENTION

Hydrated chromium III oxide, identified empirically as $Cr_2O_3.nH_2O$, is incorporated into an anion exchange resin thereby providing a novel composite useful in removing a wide spectrum of polyvalent metal cations, even simultaneously, from aqueous solutions and then releasing said cations when the composite is regenerated with water.

DETAILED DESCRIPTION OF THE INVENTION

The known composites referred to above, where hydrous lithium aluminate and hydrous magnesium aluminates are incorporated into anion exchange resins, involve crystalline aluminates which selectively remove certain metals from the presence of competing metals. In contradistinction thereto, the composites of the present invention involve amorphous hydrous chromium oxide, in an anion exchange resin, which removes, even simultaneously, a wide spectrum of polyvalent cations from brine solution.

The hydrated chromium III oxide may be expressed by the empirical formula $Cr_2O_3.nH_2O$ where $nH_2O$ represents waters of hydration. It is incorporated into the resin by in-situ ammonia precipitation of chromium chloride solution or by the in-situ precipitation with any soluble alkali such as sodium hydroxide, sodium carbonate, sodium sulfide, their potassium analogs, and the like. On standing it becomes less soluble in acids.

The anion exchange resin with which one starts, may be any particulate water-insoluble polymeric resin which contains basic amine groups attached to the polymeric resin. Macroporous anion exchange resins are preferred over the gel-type resins.

By "macroporous", as the term is commonly used in the resin art, it is generally meant that the pores, voids, or reticules are substantially within the range of about 200 to about 2000 Å. Another term, meaning the same thing is "macroreticular."

Of particular interest are macroporous anion exchange resins sold as DOWEX (a trademark of The Dow Chemical Company) MWA-1 as the chloride form of a particulate polystyrene highly crosslinked with divinylbenzene having $-CH_2N(CH_3)_2$ groups attached to the benzene rings. These resins have a particle size, generally, of about 20–50 mesh (U.S. Standard Sieve size) and about 30–40% porosity with an internal surface area of about 30–50 $m^2/gm$. Thus, each particle is a reticular solid containing pores of about 200–800 Å in size. The base capacity is about 4.2–4.3 meq./gm. of dry resin in its basic (or free amine) form. The base strength, as measured by a glass electrode in 26% NaCl, is $K_b = 4 \times 10^{-7}$ (mid-point in acid-base titration curve is pH = 7.6).

Other resins of particular interest are, e.g., those similar to DOWEX MWA-1, with the amine group being $-CH_2NRR'$ where R and R' may be, individually, a hydrogen or alkyl group of 1–4 carbon atoms. Also, resins containing other amines or amino groups (tertiary, primary, secondary, cyclic) are within the purview of the present invention.

Other exchange resins which may be employed may be any anion exchange resins with a base strength greater than $K_b = 1 \times 10^{-7}$, with macroporous resins being preferred, e.g., Amberlyst A-21.

The Kirk-Othmer Encyclopedia of Chemical Technology, vol. 11, pp. 871–899 on the subject of "Ion Exchange", including discussions of commercially available anion exchange resins, is a helpful reference. Another helpful reference is a book titled "Ion Exchange" by Friedrich Helfferich published by McGraw-Hill, 1962.

Detailed information about pore sizes of "gel-type", "microreticular", and macroreticular" ion exchange resins may be found in Ion Exchange in The Process Industries published in 1970 by The Society of Chemical Industry, 14 Belgrave Square, London, S.W.I., England.

Among the macroporous anion exchange resins, which are within the purview of the present invention are: strongbase resins containing quaternary ammonium groups fixed to a poly(styrene-divinylbenzene); poly(vinyltoluene) which has been side-chain chlorinated and reacted with a tertiary amine to form a quaternary ammonium salt; or any of the water-insoluble, but water-swellable aromatic polymers containing quaternary ammonium groups such as those named in the market place as DOWEX MSA-1. Other macroporous basic resins are, e.g., AMBERLYST A-26 and 27 and DOWEX WGR.

Also gel-type anion exchange resins which contain primary, secondary, tertiary amine and quaternary ammonium groups are operable, such as Amberlite IRA-400, Amberlite IRA-401, Amberlite IRA-402, Amberlite IRA-900, Duolite A-101-D, Duolite ES-111, Dowex 1, Dowex 11, Dowex 21K, Ionac A540, Dowex 44, Duolite A-7, Ionac A-260 and Amberlite IRA-68. Such commercial resins are discussed and described in the literature, such as in the Kirk-Othmer Encyclopedia of Technology and product brochures.

In determining the efficacy of an exchange resin for use in the present invention, particulate macroporous resins which have a porosity of at least about 15%, an internal surface area of at least about 10 $m^2/gm$ and a base capacity of at least about 2.0 meq./gm. (dry, basic form) are preferred.

Such resins, if obtained in the base form, are preferably converted to the chloride-form prior to being contacted with the aq. $CrCl_3$. This is conveniently done by treating the amine-form, under reduced pressure, with an excess of aqueous HCl, then filtering, washing and draining off the water. A pressure differential across the filter may be employed to speed the draining process, if desired.

The $CrCl_3$ which is used in treating the chloride-form of the resin is conveniently, and preferably, a saturated aqueous solution containing about 31% to about 32% $CrCl_3$ though weaker concentrations are operable, giving less capacity. Hydrates of $CrCl_3$, such as $CrCl_3.6H_2O$, are useful in preparing the aqueous solutions.

The temperature at which the resin composite is prepared may be in the range of about 0° C. to about 100° C., preferably in the range of about 25° C. to about 95° C., most preferably in the range of about 70° C. to about 90° C.

Loading of the hydrous chromium III oxide into the resin is best done repeatedly for two or more times to approach maximum loading. Parameters which decide the maximum loading are temperature, time, pore size, and chromium chloride concentration.

The general procedure is to soak the resin with an aqueous solution of the hydrous chromium III oxide precursor, then precipitate the hydrous chromium III oxide in-situ in the resin by adding a transient base, especially ammonia. By "transient base", it is meant that the base does not stay with the resin composite and is readily washed away and plays no further role in the invention.

The resin composite comprises the hydrated chromium III oxide (i.e., $Cr_2O_3.nH_2O$) deposited within the pores (voids) of the anion exchange resin. By X-ray diffraction it is found that the chromium compounds exhibit virtually no crystallinity, even when polyvalent metal cation salts are added by way of using the resin composite to remove the metal cations from solution. Since the chromium hydrate is not crystalline, it lacks selectivity; because of the lack of selectivity it is found to be a good "scavenger" for polyvalent metal ions, especially divalent metal ions.

The amount of $Cr_2O_3.nH_2O$ in the resin depends largely on the technique used for preparing the composite. Generally the loading range is from about 1.3 millimoles per ml of resin to about 2.3 millimoles per ml of resin.

The brine solutions of greatest interest in the practice of the present cation-removal process are, e.g., seawater, mineral brines, process brines, waste brines and the like, but virtually any metal salt solution is considered to be within the purview of the present invention unless it contains ingredients which would tend to dissolve the resin or the hydrated chromium or react with the present composite to convert it from an anionic resin to a cationic resin, or otherwise substantially alter or destroy the composite. Substantial amounts of organics in the aqueous system might tend to deleteriously coat the resin particles.

The resin composite should not be subjected to extremes in pH. At below 5 pH there is a tendency for the $Cr_2O_3.nH_2O$ to be removed from the resin; at above 11.5 pH there is a tendency for the $Cr_2O_3.nH_2O$ to dissolve, forming chromites. The operable pH range is between about 5 to 11.5, preferably about 6-10, most preferably about 6-8. The pH of any stream coming into contact with the resin composite, whether it be brine or regenerant, should be monitored; adjustment of the pH, if needed, may be done in ordinary manner.

The salt which constitutes the "brine" component of the solution may be the inorganic acid salt (such as halide, sulfate, nitrate, phosphate, sulfite, nitrite, phosphite, and the like) of ammonia and/or at least one alkali metal of Group IA (especially Na, K, and/or Li). Where one has an aqueous solution containing dissolved polyvalent cations which he wishes to remove, and the aqueous solution contains little or no salt, then he may add an alkali metal salt (esp. NaCl) and/or an ammonium salt to convert the aqueous solution to a brine solution and then operate the present invention on the brine.

It is recommended, for operations using the present resin composite, that the aqueous solution contain at least as many moles of ammonium and/or alkali metal salt as there are moles of polyvalent metal cations to be removed from the aqueous solution. Preferably the solution contains the ammonium and/or alkali metal salt in amounts many times the amount of the polyvalent metal cations. Highly concentrated brines are ideally suited for the present invention, though low salinity values are operable. Stated another way, ionic strengths for the salt of 0.15 or greater are preferred.

Metal cations which are removed from brine solution by the present resin composite are polyvalent metal cations. Monovalent metal cations are excluded.

Polyvalent metal cations taken up from solution by the resin composite are, e.g., $Mg^{++}$, $Cu^{++}$, $Ca^{++}$, $Co^{++}$, $Mn^{++}$, $Cd^{++}$, $La^{+++}$, $Ce^{+++}$, $Be^{++}$, $Fe^{++}$, $Ru^{+++}$, $Ni^{++}$, $Re^{++}Rh^{+++}$, $Ru^{++}$, $Sn^{++}$, and $Zn^{++}$. Other divalent and trivalent metals in the same groups of the Periodic Table as those named above are also within the purview of the process of the present invention.

The following examples are to illustrate the practice of the invention, but the invention is not limited to the embodiments illustrated.

EXAMPLE 1

(Preparation of Composite)

About 200 ml of Dowex MWA1 AN2 ion exchange resin in the chloride form was covered with a 25% chromium III chloride solution. 50 gms of chromium III chloride hexahydrate were added. The slurry was maintained at 90° C., while stirring for one hour. The slurry was vacuum filtered to separate the impregnated resin from the solution. The resin was blown with air until it became free flowing.

A solution of 37.5 gms ammonium chloride in 200 ml of concentrated ammonium hydroxide was prepared. The free flowing impregnated resin was added thereto. The slurry was stirred occasionally while sitting at room temperature. After a half-hour, the pH of the slurry was reduced to 5.5, as measured with a glass electrode by the addition of hydrochloric acid. The slurry was filtered to remove the impregnated resin. The resin was washed thoroughly with deionized water.

The resin was next covered with a 25% chromium III chloride solution to which were added 50 gms of chromium III chloride hexahydrate. The slurry was maintained at 90° C. while stirring for a half-hour. The slurry was vaccum filtered to separate the impregnated resin from the solution. The resin was blown with air until it became free flowing.

The free flowing resin was then put into 200 ml concentrated ammonium hydroxide containing 37.5 gms ammonium chloride. The slurry was allowed to set at room temperature with occasional stirring for a half hour. The pH of the slurry was then reduced to 5.5 by the addition of hydrochloric acid. The slurry was filtered to remove the impregnated resin. The resin was washed thoroughly with water. The resin was then transferred to a container wherein it was covered with a 25% solution of chromium III chloride to which had been added 50 gms of chromium III chloride hexahydrate. The stirred slurry was maintained at 90° C. for fifteen minutes. The slurry was vacuum filtered to separate the impregnated resin. The resin was then air blown to free flowing.

The free flowing resin was then put into 200 ml concentrated ammonium hydroxide containing 37.5 gms ammonium chloride. The slurry was allowed to sit at room temperature with occasional stirring for a half-hour. The slurry was filtered and the resin washed thoroughly with water. The resin was transferred to a 25% solution of sodium chloride. The pH, as measured with a glass electrode, was adjusted to 6.7 at 70° C. by the additon of hydrochloric acid.

Upon completion of the above procedure the resin was found by analysis to contain 1.75 millimoles of chromium per ml of product.

EXAMPLE 2

(Use of Composite)

An ion exchange column was provided by using a jacketed Pyrex glass tube, one-half inch inside diameter and 27 inches long. A glass wool (porous) plug was placed in the bottom of the tube, 120 ml of the resin composite of Example 1 above was added, and a glass wool (porous) plug was placed on top of the resin in the tube. By circulating heated, temperature-controlled ethylene glycol through the jacket, the temperature of the composite mixture within the tube could be regulated. Flow means, flow-regulators, and valving were provided whereby liquid process streams could be flowed downwardly through the tube, exiting from the lower portion, or flowed upwardly, exiting from the upper portion of the tube. The composite-loaded tube held 1 bed volume (120 cc) of the resin composite covered with residual wash water from a previous run.

The influent brine (to be treated) was a 24.5% NaCl brine containing 383 ppm calcium and 6 ppm magnesium. The influent brine was passed upwardly through the column at about average 3.11 cc/min. at a column temperature of about 60° C. Effluent coming out was collected in graduated cylinders and analyzed for calcium and magnesium.

After about 701 ml of effluent had been collected, the influent brine was stopped and water was passed downwardly through the column and effluent coming out the bottom was collected; the water wash was stopped after about 358 ml had been collected. At this point, the column, still filled with water (or with water drained out), was ready for another cycle of influent brine. Analysis data are shown in Table I below. The analysis for calcium and magnesium for the second 50 ml cut was inadvertently spoiled and no analysis (N.A.) is shown in Table I for that sample. In Table I "DO" means ditto. The first cut reflected $Ca^{++}$ and $Mg^{++}$ values still remaining from a previous washing step.

TABLE I

| Cut No. | Effluent Vol. cc | dens. gm/cc | $\Sigma V_i$ cc | $\Sigma V_i - \frac{V_i}{2}$ bed vols. | Ca ppm | Mg ppm | influent | Flow ml/min. |
|---|---|---|---|---|---|---|---|---|
| 1 | 50 | 0.992 | 25 | 0.21 | 59 | 3.2 | brine ↑ | 2.4 |
| 2 | 50 | 1.049 | 75 | 0.63 | NA | NA | " | 2.9 |
| 3 | 21 | 1.109 | 111 | 0.92 | 2.2 | 0.1 | " | 3.2 |
| 4 | 100 | 1.159 | 171 | 1.43 | 0.5 | 0.1 | " | 3.3 |
| 5 | 100 | 1.193 | 271 | 2.26 | 0.3 | 0.2 | " | 3.1 |
| 6 | 100 | 1.194 | 371 | 3.09 | 0.4 | 0.2 | " | 3.2 |
| 7 | 50 | 1.179 | 446 | 3.72 | 0.6 | 0.2 | " | 3.6 |
| 8 | 50 | 1.197 | 496 | 4.13 | 0.6 | 0.2 | " | 3.5 |
| 9 | 50 | 1.180 | 546 | 4.55 | 0.7 | 0.2 | " | 3.1 |
| 10 | 50 | 1.194 | 596 | 4.97 | 0.5 | 0.2 | " | 3.1 |
| 11 | 50 | 1.182 | 646 | 5.38 | 0.7 | 0.2 | " | 3.1 |
| 12 | 30 | 1.182 | 686 | 5.72 | 0.8 | 0.2 | " | 3.3 |
| 13 | 50 | 1.193 | 726 | 6.05 | 363 | 3.9 | water ↓ | 2.4 |
| 14 | 50 | 1.139 | 776 | 6.47 | 670 | 6.7 | " | 3.2 |
| 15 | 50 | 1.077 | 826 | 6.89 | 1012 | 7.8 | " | 3.8 |
| 16 | 50 | 1.039 | 876 | 7.30 | 1222 | 8.9 | " | 3.2 |
| 17 | 50 | 1.005 | 926 | 7.72 | 1480 | 10.5 | " | 3.2 |
| 18 | 50 | 1.003 | 976 | 8.14 | 1621 | 12.7 | " | 2.6 |
| 19 | 50 | 0.990 | 1026 | 8.55 | 682 | 7.5 | " | 3.8 |
| 20 | 8.5 | 0.980 | 1056 | 8.79 | 459 | 5.7 | " | 6.5 |

EXAMPLE 3

A resin composite prepared as in Example 1 above was tested with the same brine feed (383 ppm calcium) as in Example 2 above except at different temperatures, viz. at about 25° C., about 52° C., about 72° C., and about 93° C. Calcium analysis of the effluent was compared with number of bed volumes passed through the column. The flow rate through the column was about 0.026±0.001 bed volumes per minute. Table II below shows representative data.

TABLE II

| Bed Volumes | Calcium in Effluent, ppm(approx.) | | | |
|---|---|---|---|---|
| | 25° C. | 52° C. | 72° C. | 93° C. |
| 0.2 | 48 | 73 | 58 | 86 |
| 0.6 | 32 | 17 | 27 | 29 |
| 1.0 | 2.0 | 1.7 | 2.1 | 3.1 |
| 1.4 | 1.1 | 0.86 | 0.9 | 1.9 |
| 2.0 | 0.5 | 0.35 | 0.6 | 1.4 |
| 3.0 | 0.5 | 0.42 | 0.6 | 1.4 |
| 4.0 | 1.0 | 0.51 | 0.6 | 1.4 |
| 5.0 | 4.0 | 0.62 | 0.6 | 1.5 |
| 6.2 | 30 | 7.0 | 1.4 | 2.0 |
| 6.5 | 40 | 8.5 | 1.9 | 3.2 |

The high calcium values at 93° C. are believed to have been caused by air in the column which is released from the solution at such high temperature.

EXAMPLE 4

A resin composite was prepared substantially in accordance with the procedure of Example 1 except that the anion exchange resin was one commercially available under the tradename DOWEX WGR. The resin differs from that of Example 1 in that it is a high capacity weak base anion exchange resin of the epoxy-amine type.

The resin composite was tested substantially according to the procedure of Example 2, at 60° C., but the flow rate was varied for 3 separate runs. Analysis of calcium was compared with bed volumes for each of the flow rates. The brine influent contained 383 ppm calcium. Approximate values for the data are shown in Table III. In the table flow rate is given as "bvpm" which means bed volumes per minute.

TABLE III

| Bed Volumes | Calcium in Effluent, ppm | | |
|---|---|---|---|
| | 0.040 bvpm | 0.050 bvpm | 0.058 bvpm |
| 0.2 | 55 | 36 | 45 |
| 0.7 | 44 | 30 | 27 |
| 1.0 | 3.2 | 4.8 | 5.7 |
| 1.3 | 1.8 | 1.4 | 2.4 |
| 1.7 | 0.6 | 0.4 | 0.5 |
| 2.6 | 0.6 | 0.3 | 0.4 |
| 4.0 | 0.6 | 0.4 | 0.5 |
| 6.0 | 0.6 | 0.4 | 0.5 |
| 6.8 | 0.6 | 0.4 | 1.1 |
| 8.0 | 0.6 | 0.9 | 4.5 |
| 9.0 | 2.3 | 3.5 | 9.5 |

EXAMPLE 5

Two different particle size ranges were compared using resin composites prepared substantially in accordance with Example 1. One sample was in the range of about $-10+20$ mesh size and one sample was of smaller size, being in the range of $-20+50$ mesh size. Using a 26% NaCl brine containing about 383 ppm calcium, a flow rate of about 0.026 bvpm, and a temperature of about 60° C., it was found that the smaller size gave effluent with slightly lower calcium content.

Also, the smaller size did not begin to show calcium breakthrough (evidenced by increasing amounts of calcium in the effluent) until about 7 bed volumes had been passed through as compared to the larger size which showed calcium breakthrough at about 5 bed volumes.

EXAMPLE 6

In a series of tests made substantially in accordance with Example 2, using a resin composite prepared as in Example 1, but using a resin in the particle size range of about $-40+50$ mesh and using 4 different flow rates at 60° C., it was found that a flow rate of about 0.081 bvpm performed slightly better than 0.096 bvpm. The 0.096 bvpm flow performed slightly better than the 0.102 bvpm flow. The 0.102 bvpm flow performed substantially better than the 0.113 bvpm flow.

EXAMPLE 7

A resin composite ($Cr_2O_3 \cdot nH_2O$ in DOWEX MWA1-AN2 anion exchange resin) prepared substantially in accordance with the procedure of Example 1, was tested substantially in accordance with Example 2 in several instances, including Examples 3, 5, and 6 above, using a 24.5% NaCl brine containing 383 ppm calcium and 6 ppm magnesium as the influent to be treated. Data which are typical for $Mg^{++}$ removal from the brine at 60° C. are shown in Table IV below.

TABLE IV

| Analysis (Approx.) | Bed Volumes of Effluent Through Column | | | | | | | |
|---|---|---|---|---|---|---|---|---|
| | 0.25 | 0.6 | 1.1 | 1.5 | 2.0 | 4.0 | 6.0 | 8.0 |
| Mg (ppm) | 2.0 | 0.9 | 0.2 | 0.1 | 0.1 | 0.1 | 0.1 | 0.1 |

EXAMPLE 8

A resin composite ($Cr_2O_3 \cdot nH_2O$ in DOWEX MWA1-AN2 anion exchange resin) which has been employed to extract $Mg^{++}$ values and $Ca^{++}$ values from a NaCl brine are regenerated at 60° C. using water at a flow rate of 0.062 bvpm. Table V below shows analysis of the wash water at various bed volumes of effluent.

TABLE V

| Analysis (Approx.) | Bed Volumes of Water Wash Through Column | | | | | |
|---|---|---|---|---|---|---|
| | .02 | .065 | 1.05 | 1.45 | 1.8 | 2.3 |
| Mg (ppm) | 3.0 | 3.8 | 40 | 40 | 21 | 7.5 |
| Ca (ppm) | 300 | 750 | 4300 | 2200 | 1150 | 420 |

EXAMPLE 9

A resin composite ($Cr_2O_3 \cdot nH_2O$ in DOWEX MWA1 AN2 anion exchange resin) was ground and screened. The $-40+70$ screen cut was used substantially by the procedure of Example 2, using the column at 60° C. Data are shown in Table VI below.

TABLE VI

| Cut No. | Vol. cc | Effluent dens. gm/cc | $\Sigma V_i - \frac{V_i}{2}$ bed vols | Ca ppm | Mg ppm | influent | Flow cc/min. |
|---|---|---|---|---|---|---|---|
| 1 | 100 | 1.000 | 50 | 0.42 | 8.7 | 0.3 | brine ↑ | 12.1 |
| 2 | 83 | 1.161 | 141 | 1.18 | 0.6 | 0.1 | " | 12.4 |
| 3 | 250 | 1.176 | 308 | 2.57 | 0.1 | 0.1 | " | 12.0 |
| 4 | 250 | 1.184 | 558 | 4.65 | 0.1 | 0.1 | " | 12.1 |
| 5 | 250 | 1.188 | 808 | 6.73 | 0.2 | 0.1 | " | 12.1 |
| 6 | 100 | 1.165 | 983 | 8.19 | 3.0 | 0.1 | " | 12.2 |
| 7 | 50 | 1.168 | 1058 | 8.82 | 9.0 | 0.1 | " | 12.2 |
| 8 | 50 | 1.172 | 1108 | 9.23 | 15.3 | 0.1 | " | 12.1 |
| 9 | 50 | 1.165 | 1158 | 9.65 | 22.9 | 0.1 | " | 12.3 |
| 10 | 50 | 1.174 | 1208 | 10.07 | 30.1 | 0.1 | " | 12.2 |
| 11 | 43 | 1.160 | 1254 | 10.45 | 39.3 | 0.1 | •" | 12.6 |
| 12 | 50 | 1.173 | 1301 | 10.84 | 290 | 2.6 | water ↓ | 9.6 |
| 13 | 50 | 1.163 | 1351 | 11.26 | 390 | 3.9 | " | 9.6 |
| 14 | 50 | 1.039 | 1401 | 11.68 | 4312 | 36.9 | " | 10.6 |
| 15 | 50 | 1.000 | 1451 | 12.09 | 2483 | 21.5 | " | 11.2 |
| 16 | 50 | 1.000 | 1501 | 12.51 | 1475 | 11.7 | " | 11.1 |
| 17 | 45 | 0.992 | 1548 | 12.90 | 811 | 7.9 | " | 11.5 |

EXAMPLE 10

A resin composite of the present invention was used in removing $Mn^{++}$ ions from a brine containing 24.4% NaCl and about 4 ppm $Mn^{++}$ ions and having a pH of 6.4. About 6.5 bed volumes were passed through the resin at a flow rate of 0.058 bvpm. The effluent from the column contained less than 0.2 ppm $Mn^{++}$. The bed was regenerated by counterflowing about 5.17 bed volumes of de-ionized water through the resin bed at a rate of 0.058 bvpm. The temperature of the column was maintained during the loading and unloading (regenerating) of the resin at 60±3° C.

EXAMPLE 11

By the practice of the present invention, $Cd^{++}$, $Ce^{+++}$, and $La^{+++}$ are reduced from a level of about 40–100 ppm in NaCl brine to a level lower than the detectable limits. The lower limits of detection for Cd and La was 0.1 ppm and for Ce was 1 ppm.

I claim:
1. A process for removing polyvalent metal cations from an aqueous solution, said process comprising,
providing an ion exchange vessel containing a porous anion exchange resin which has $Cr_2O_3 \cdot nH_2O$ incorporated within its pores,
contacting said aqueous solution with said resin in said vessel, and removing from said vessel the aqueous solution with at least an appreciable amount of the polyvalent metal cations remaining with the resin.

2. The process of claim 1 wherein the ion exchange vessel has a known bed volume and the aqueous solution is flowed substantially continuously into and out of the resin in the vessel until a predetermined number of bed volumes have passed through or until the resin has substantially become exhausted in its ability to retain additional quantities of the polyvalent metal ions.

3. The process of claim 2 wherein the resin is substantially regenerated by use of a water wash to remove the polyvalent metal cations taken up therein.

4. The process of claim 1 wherein the resin is substantially regenerated by use of a water wash to remove the polyvalent metal cations taken up therein.

5. The process of claim 1 wherein the polyvalent metal cations are divalent and/or trivalent ions of at least one metal of the Periodic Table Groups consisting of IIA, IIIB, VIIB, VIII, IB, IIB, IIIA, and IVA.

6. The process of claim 1 wherein the aqueous solution contains salinity values with an ionic strength of 0.15 or greater.

* * * * *